(12) United States Patent　　　(10) Patent No.: US 12,561,841 B2
Han　　　(45) Date of Patent: Feb. 24, 2026

(54) MULTILINEAR DOMAIN-SPECIFIC DOMAIN GENERALIZATION

(71) Applicant: NEC Laboratories America, Inc., Princeton, NJ (US)

(72) Inventor: Shaobo Han, Princeton, NJ (US)

(73) Assignee: NEC Corporation, Tokyo (JP)

( * ) Notice: Subject to any disclaimer, the term of this patent is extended or adjusted under 35 U.S.C. 154(b) by 1000 days.

(21) Appl. No.: 17/592,447

(22) Filed: Feb. 3, 2022

(65) Prior Publication Data

US 2022/0247146 A1　Aug. 4, 2022

Related U.S. Application Data

(60) Provisional application No. 63/145,743, filed on Feb. 4, 2021.

(51) Int. Cl.
　*G06T 7/00*　　　(2017.01)
　*G06V 10/14*　　(2022.01)
　*G06V 10/82*　　(2022.01)

(52) U.S. Cl.
　CPC ................ *G06T 7/97* (2017.01); *G06V 10/14* (2022.01); *G06V 10/82* (2022.01)

(58) Field of Classification Search
　CPC .......... G06T 7/97; G06V 10/14; G06V 10/82
　See application file for complete search history.

(56) References Cited

U.S. PATENT DOCUMENTS

| | | | |
|---|---|---|---|
| 9,617,847 B2 * | 4/2017 | Jaaskelainen | ......... E21B 47/135 |
| 10,572,829 B1 * | 2/2020 | Willinger | ............... E21B 49/00 |
| 10,824,693 B2 * | 11/2020 | Baskaran | ................. G06F 17/16 |
| 12,289,132 B2 * | 4/2025 | White | .................... G01H 9/004 |
| 12,454,067 B2 * | 10/2025 | Padir | .................... G01N 21/255 |
| 2018/0357542 A1 * | 12/2018 | Wu | .......................... G06N 5/01 |
| 2019/0235106 A1 * | 8/2019 | Dev | ........................ G01V 1/301 |
| 2020/0018149 A1 * | 1/2020 | Luo | ........................ E21B 47/135 |
| 2021/0318457 A1 * | 10/2021 | Zheng | ................... G01V 1/288 |
| 2022/0247146 A1 * | 8/2022 | Han | ....................... G06V 10/14 |
| 2023/0132161 A1 * | 4/2023 | Li | ...................... G01D 5/35341 |
| | | | 356/477 |

* cited by examiner

*Primary Examiner* — Kevin Ky

(74) *Attorney, Agent, or Firm* — Vincent Duffy; Joseph Kolodka

(57)　　　　ABSTRACT

A multilinear domain-specific domain generalization (MDSDG) approach that utilizes information stored in multilinear indices of data domains to improve machine learning. In particular—based on limited sample size(s) in observed scenarios—an array of models is jointly trained, which advantageously are generalized to a new, unseen scenario, where only domain descriptions in the form of multilinear indices are available.

6 Claims, 10 Drawing Sheets

| | Condition B1 | Condition B2 | Condition B3 |
|---|---|---|---|
| Condition A1 | Source | Target | Target |
| Condition A2 | Target | Target | Source |
| Condition A3 | Target | Source | Target |
| Condition A4 | Target | Source | Target |

| | Condition B1 | Condition B2 | Condition B3 |
|---|---|---|---|
| Condition A1 | Source | Target | Target |
| Condition A2 | Target | Target | Source |
| Condition A3 | Target | Source | Target |
| Condition A4 | Target | Source | Target |

*FIG. 1*

MULTILINEAR DOMAIN-SPECIFIC DOMAIN GENERALIZATION

CROSS REFERENCE TO RELATED APPLICATIONS

This application claims the benefit of U.S. Provisional Patent Application Ser. No. 63/145,743 filed 4 Feb. 2021 the entire contents of which is incorporated by reference as if set forth at length herein.

TECHNICAL FIELD

This disclosure relates generally to artificial intelligence (AI) and machine learning (ML). More particularly, it pertains to multilinear domain-specific domain generalization (MDSDG) which utilizes information stored in multilinear indices of data domains to improve learning.

BACKGROUND

As will be understood by those skilled in the art, in many applications, datasets collected are oftentimes cross classified using several categorical factors, representing a set of experimental or environmental conditions. Notably, there exists domain-shifts among data collected under different conditions, and to minimize bias, one needs to collect diverse data to cover all domains. However, due to the cost of data collection in the field, it is generally prohibitive and impractical to cover all possible combinations of factors, and as such a sample size for each experimental condition is limited. In many cases, data collected from a target domain is not accessible during a training phase.

For such data, a traditional i.i.d. (aka independent and identically distributed) assumption on the whole dataset may not be appropriate, instead, the data distribution varies with the combination of factors. It is important to accommodate data shifts across different data domains to allow for out-of-distribution (OoD) generalization. The information stored in multilinear indices (tensor) structure within data domains is usually ignored, which leads to inferior sample efficiency and generalized performance.

SUMMARY

An advance in the art is made according to aspects of the present disclosure directed to a multilinear domain-specific domain generalization (MDSDG) approach that utilizes information stored in multilinear indices of data domains to improve machine learning. In particular—based on limited sample size(s) in observed scenarios—an array of models is jointly trained, which advantageously are generalized to a new, unseen scenario, where only domain descriptions in the form of multilinear indices are available.

As we shall show and describe, according to aspects of the present disclosure an array of models is trained jointly within observed data domains. Instead of using a flat indices structure, a tensor structure of domain is used explicitly to describe domain relatedness and facilitate information sharing across data domains during training.

Further, models are trained under a limited number of training scenarios (i.e., domains) where collected data is available, generalized to a new unseen domain with the help of the tensor completion for model assembly at test time.

Use tensor as a representation of data collection conditions, in the form of multiple categorical factors. It captures how different domains are related to each other Use tensor decomposition as a compact and expressive tool to uncover the underlying hidden structure within each factor, and use it to impose low-rank regularization on the model parameter, where training data within each domain is not sufficient Assembly them to create a new model for an unseen domain with no training data

BRIEF DESCRIPTION OF THE DRAWING

A more complete understanding of the present disclosure may be realized by reference to the accompanying drawing in which:

FIG. 1 is a schematic diagram of an illustrative problem formulation for domain specific generalizations across a 4×3 contingency according to aspects of the present disclosure;

FIG. 2(A) dry, FIG. 2(C) dry, FIG. 2(B) wet, and FIG. 2(D) wet, according to aspects of the present disclosure;

Figure 2A:
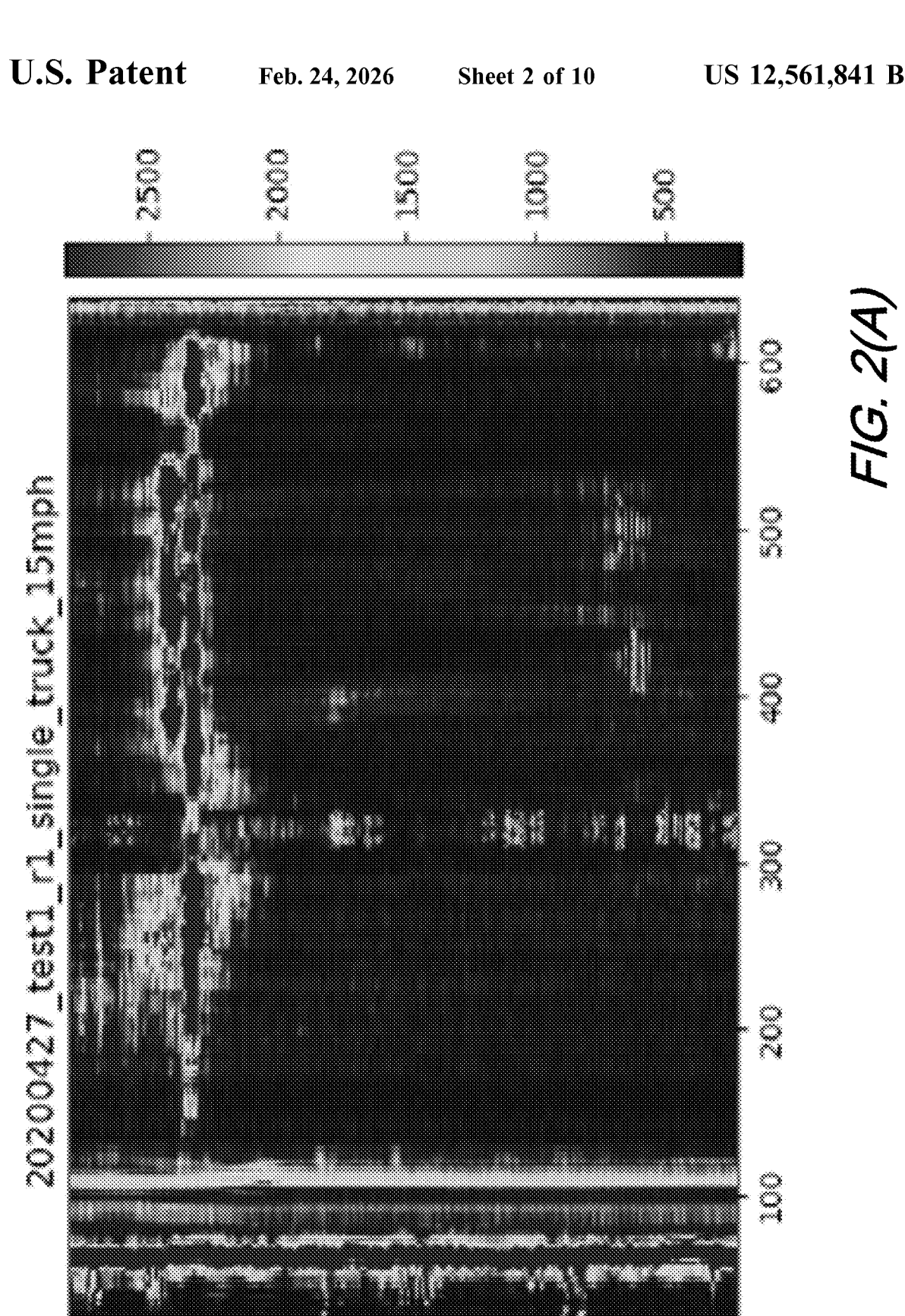
FIG. 2(A), FIG. 2(B), FIG. 2(C), and FIG. 2(D) are a series of illustrative distributed optical fiber sensing (DOFS) waterfall images of a vehicle crossing/not crossing a rumble strip when the ground is.
Figure 2B:
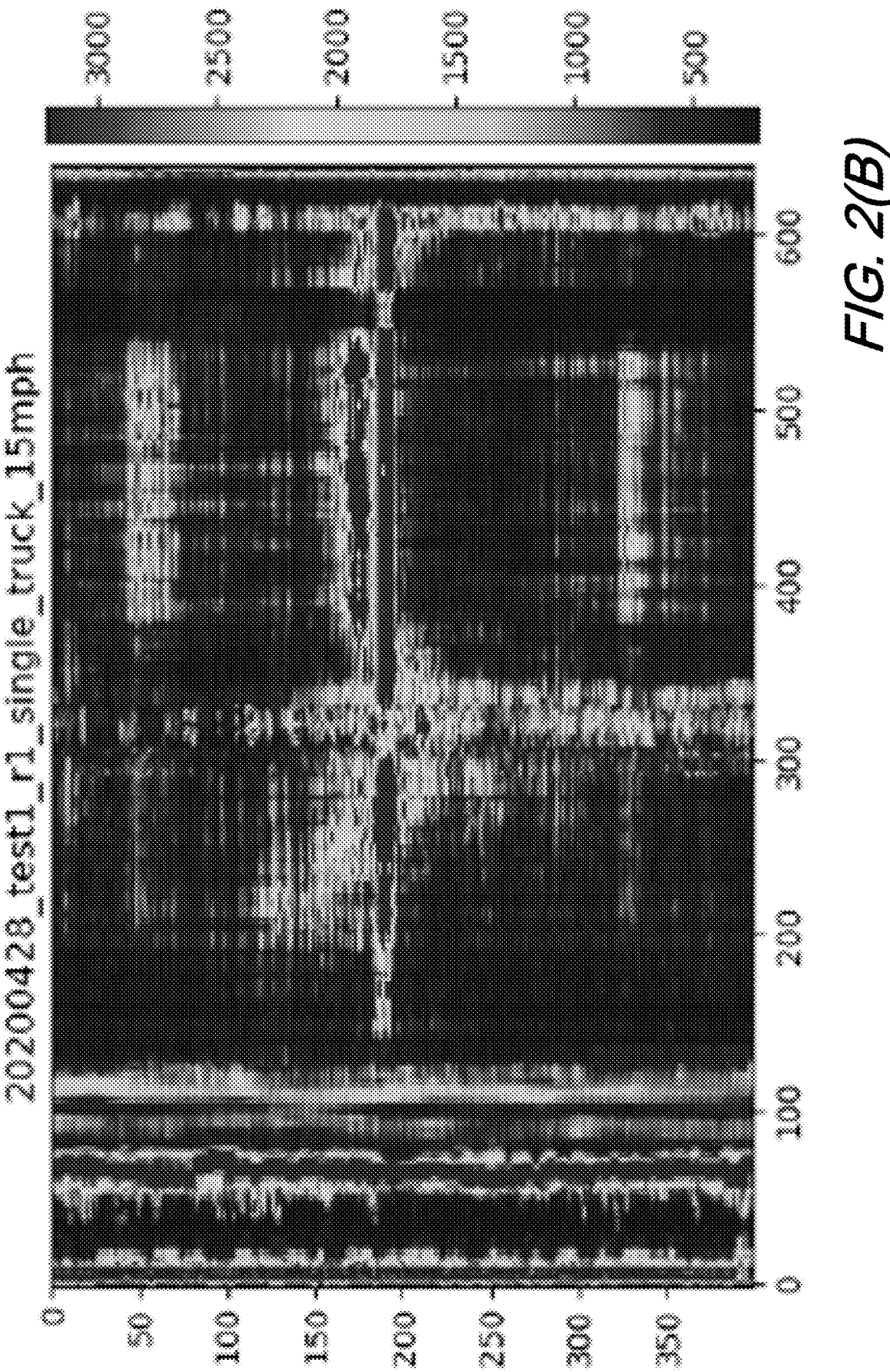
Figure 2C:
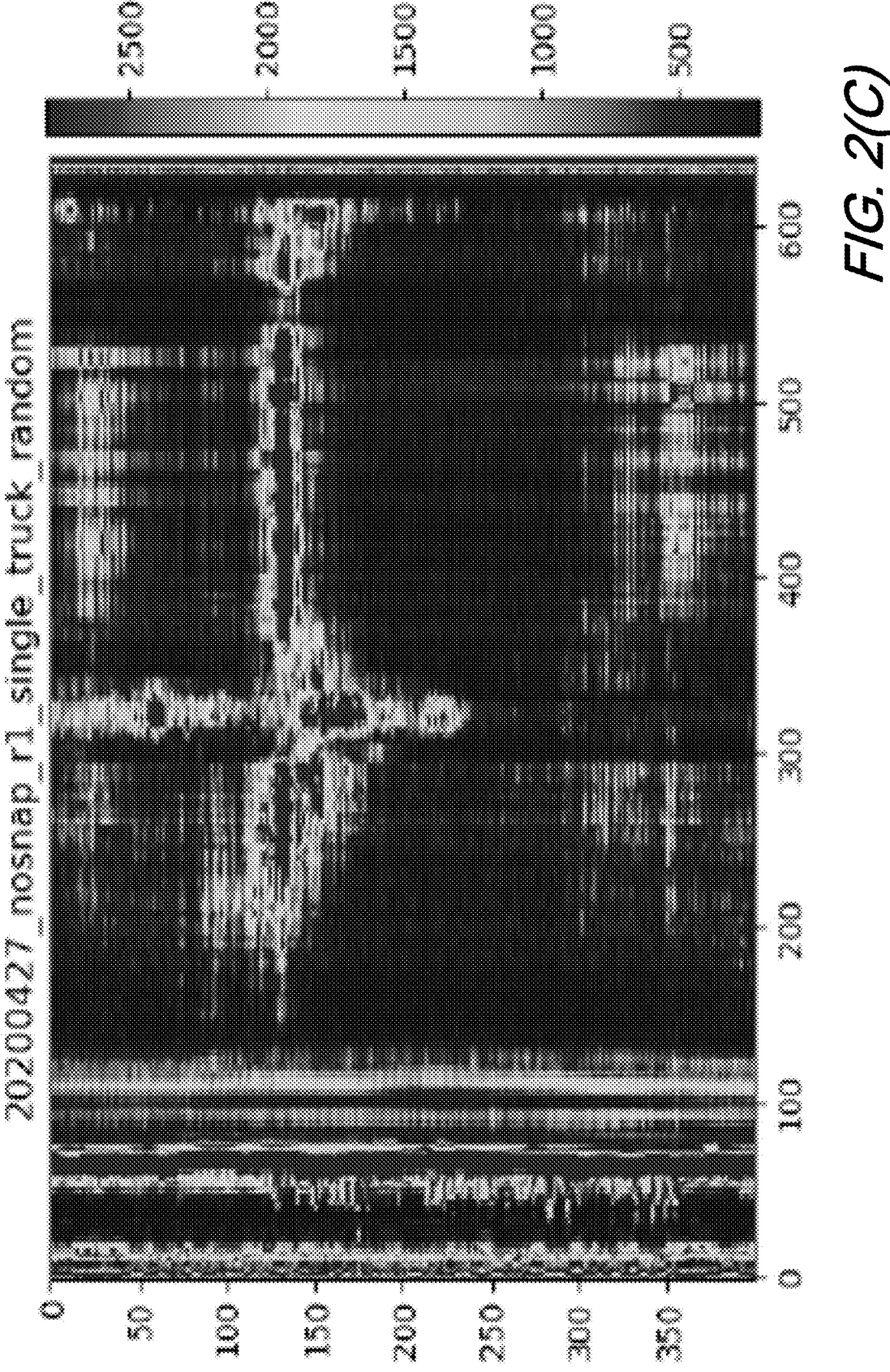
Figure 2D:
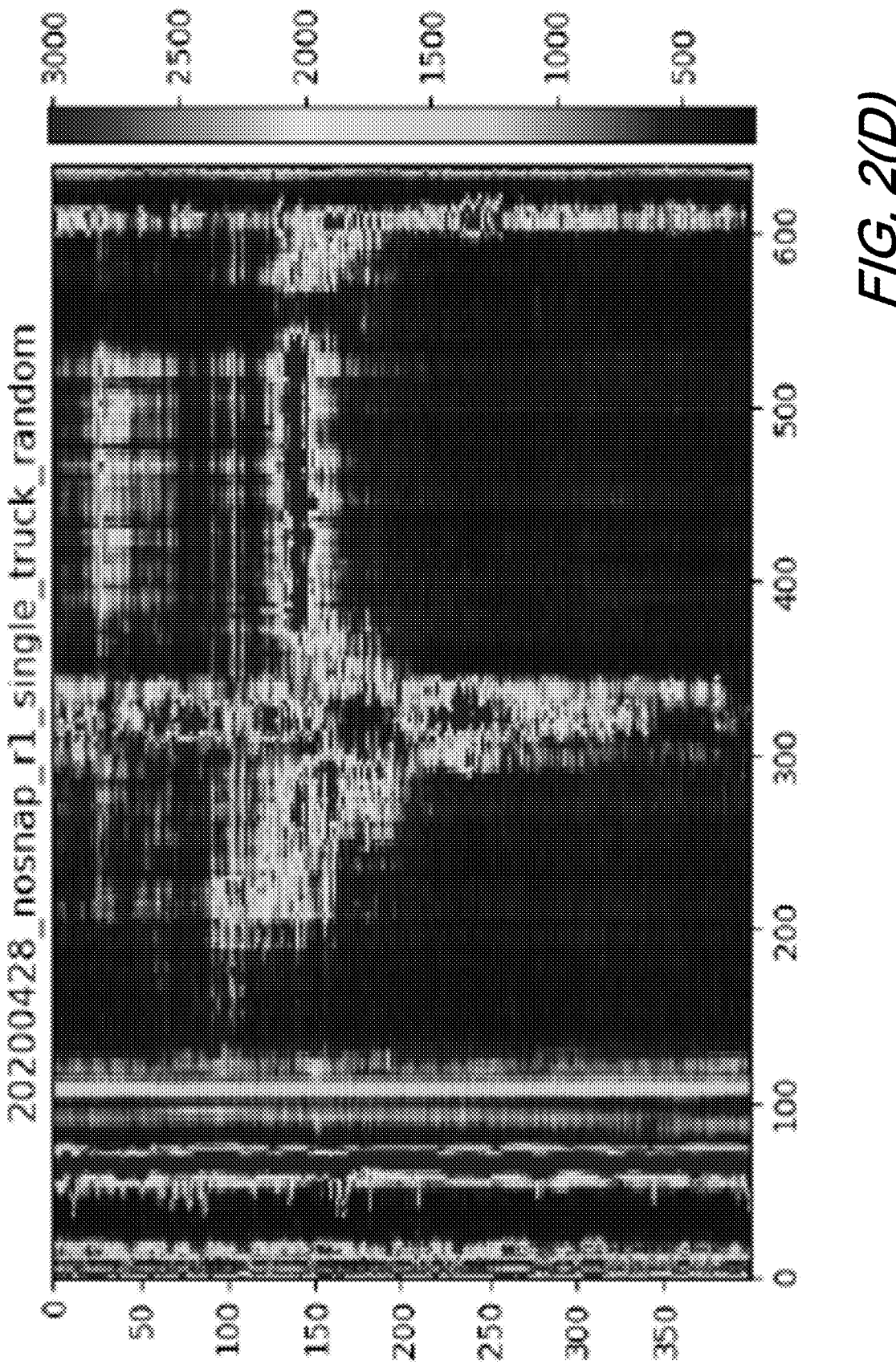

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

As will be understood and appreciated by those skilled in the art, one challenge for field deployment of AI algorithms is that training data collection only covers a few limited, known scenarios, and/or with a limited sample size in each scenario. According to aspects of the present disclosure, we now describe multilinear indices structure leveraged to: (1) train better models using a few known scenarios, and (2) adapt such model(s) to new unseen scenarios, where training data is nonexistent. As a result, data collection can be planned more purposefully with fewer know scenarios.

FIG. 1 is a schematic diagram of an illustrative problem formulation for domain specific generalizations across a 4×3 contingency according to aspects of the present disclosure.

With reference to that figure, we may observe an example in which datasets are indexed by two factors, A and B. As shown further, factor A has four levels (A1, A2, A3, A4) and factor B has three levels (B1, B2, B3). Datasets collected from several source domains (A1B1, A2B3, A3B2, A4B2) are available. The task presented is to train models specifically that can work well on target domains (A1B2, A1B3, A2B1, A2B2, A3B1, A3B3, A4B1, A4B3), where no training data is available.

At this point we note that one important application of the present disclosure is distributed fiber optic sensing (DFOS) applications although it is generally applicable to other applications as well. With DFOS, the datasets are usually collected under various heterogeneous factors. For example, in traffic sensing applications, factors include (1) weather conditions (sunny-dry, rainy-wet), (2) ground type (grass, pavement), (3) sensing distance (<1 km, >5 km, >10 km), and (4) vehicle type (van, sedan, truck). Those skilled in the DFOS arts will appreciate that it is very difficult to collect enough data to cover all combination(s) of factors. One question is, assuming a model has been trained for {sunny-dry, grass, <1 km} and {rainy-wet, pavement, >10 km}, can it (the model) be directly used for a new unseen scenarios such as {rainy-wet, grass, <1 km} or {sunny-wet, pavement, >10 km}, without retraining?

To solve this problem, traditional domain generalization methods learn a domain-agnostic model, that is, one common model that works well on all kinds of different unseen domains. Such approaches neglect a multilinear structure describing the difference and relatedness between source and target domains. Meanwhile, the recorded sensing data exhibit distinct characteristics across heterogeneous factors which makes domain-agnostic domain generalization inappropriate.

Such is illustrated in FIG. 2(A), FIG. 2(B), FIG. 2(C), and FIG. 2(D) which are a series of illustrative distributed optical fiber sensing (DOFS) waterfall images of a vehicle crossing/not crossing a rumble strip when the ground is: FIG. 2(A) dry, FIG. 2(C) dry, FIG. 2(B) wet, and FIG. 2(D) wet, according to aspects of the present disclosure.

Given this, our disclosure outlines a multilinear domain-specific domain generalization (MDSDG), wherein the multilinear indices structure is explicitly taken into account. According to aspects of the present disclosure, model components for each level of factors are learned, and new models can be assembled by taking tensor product operations.

Figure 3A:
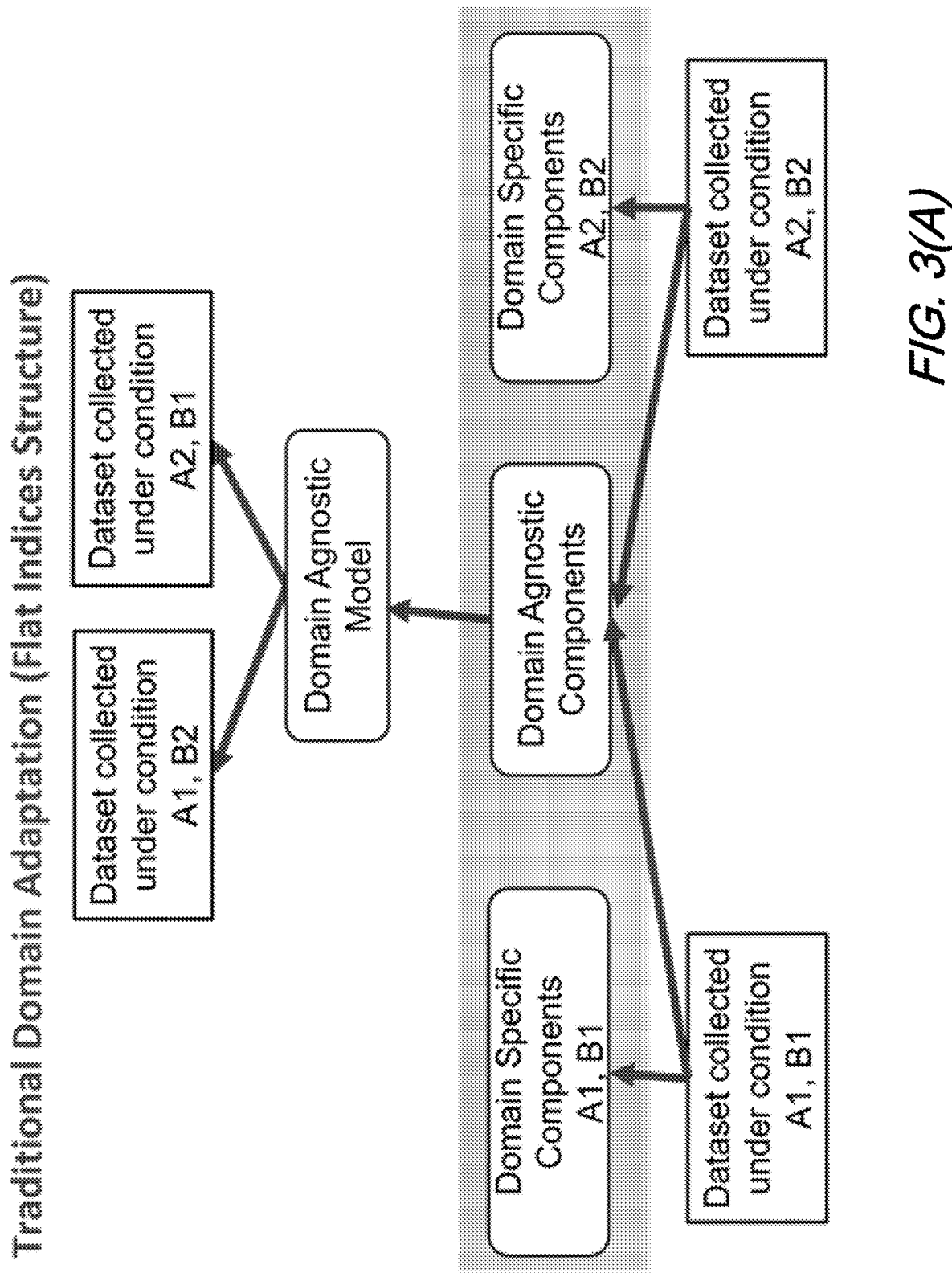
FIG. 3(A) and FIG. 3(B) are schematic block diagrams illustrating comparative difference(s) between FIG. 3(A) domain-agnostic domain generalization approaches and FIG. 3(B) domain-specific domain generalization approach based on a multilinear indices structure according to aspects of the present disclosure.
Figure 3B:
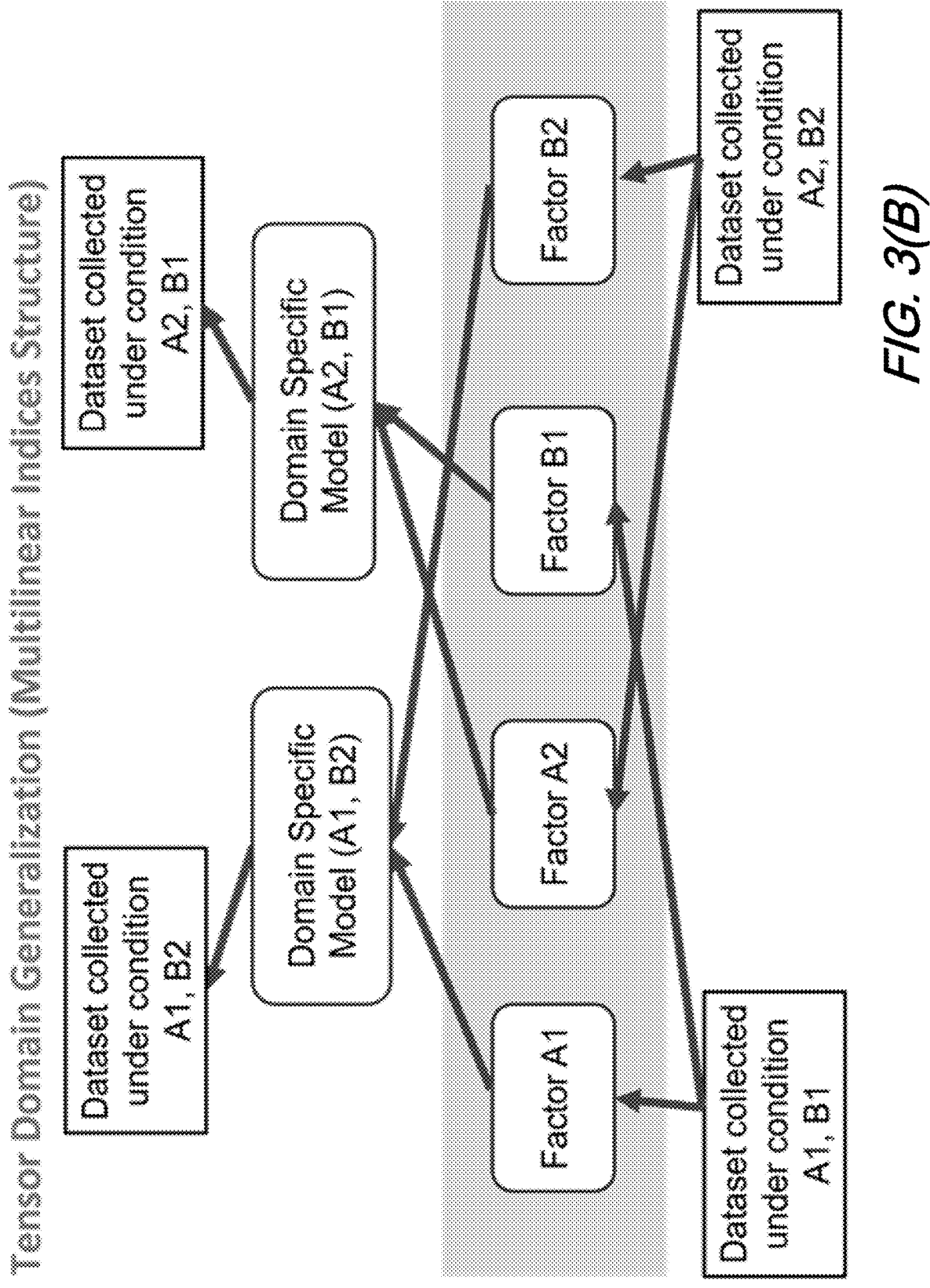

FIG. 3(A) and FIG. 3(B) are schematic block diagrams illustrating comparative difference(s) between FIG. 3(A) domain-agnostic domain generalization approaches and FIG. 3(B) domain-specific domain generalization approach based on a multilinear indices structure according to aspects of the present disclosure.

With reference to these figures, it is assumed that training datasets are collected under condition A1B1 and A2B2 only, and the trained model will be tested under new conditions A1B2 and A2B1. We note that traditional domain-agnostic approaches can only learn a common model that captures common aspects of observed domains, and hope that model will work well on both A1B2 and A2B1. Alternatively, the proposed multilinear domain generalization approach can learn domain-specific models tailored for A1B2, and A2B1. Domain-specific aspects are decoupled into factors {A1, B2, A2, B1}, and reassembled by taking tensor-product operations.

Note that unsupervised domain adaptation approaches can also learn specific models tailored for A1B2, and A2B1, but they still require unlabeled training data from these two target domains to help adapt. In sharp contrast, our inventive approach requires no training data from target domains. Also different from zero-shot learning approaches, the meta-information describing domain under which the data is collected does not have any predictability on the model output—it only influences the relationship between model input and model output.

Figure 4:
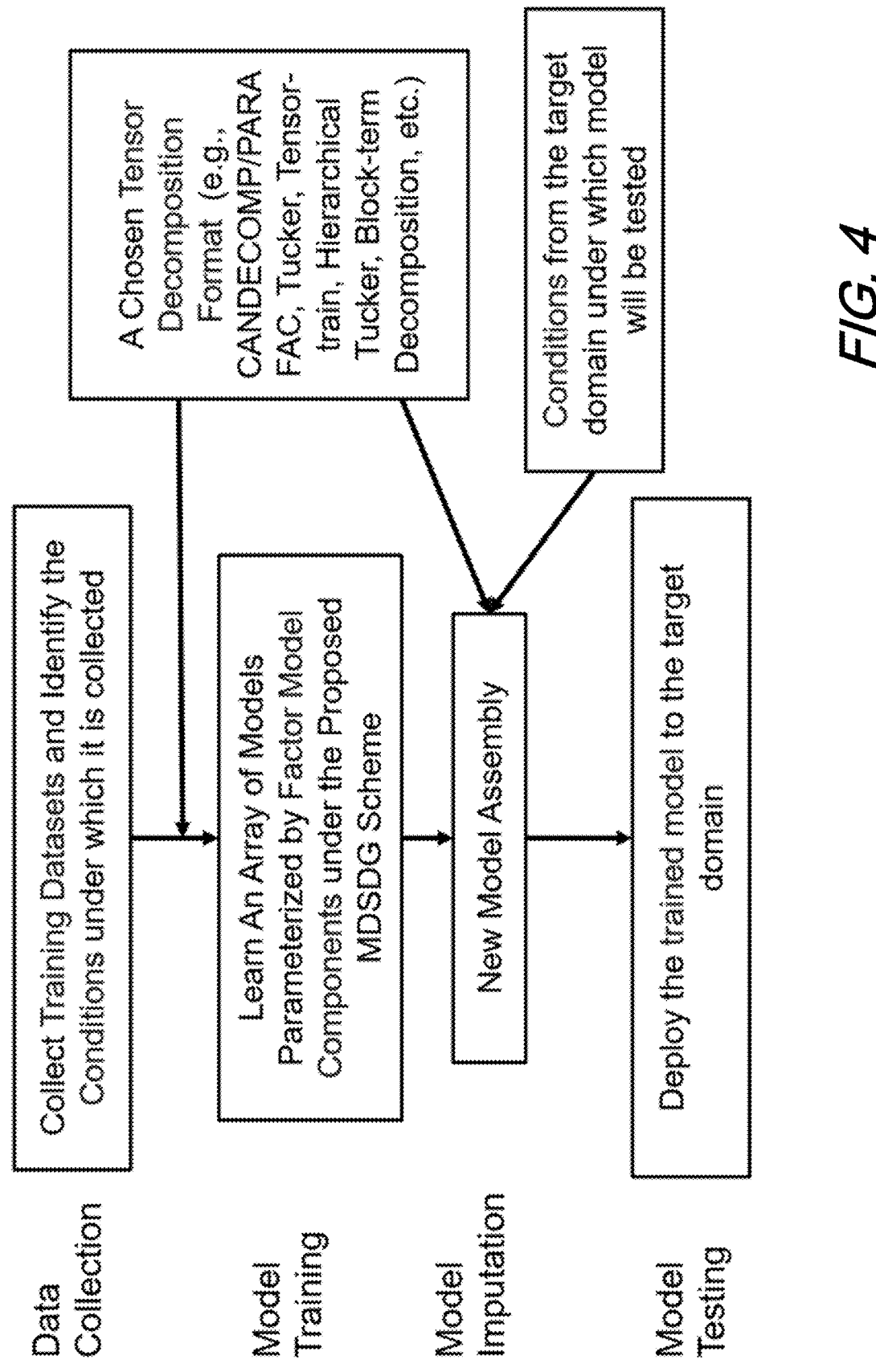
FIG. 4 is a illustrative flow chart diagram showing processes from data collection to model testing according to aspects of the present disclosure.

FIG. 4 is a illustrative flow chart diagram showing processes from data collection to model testing according to aspects of the present disclosure.

From this figure the main procedures of our inventive MDSDG method may be observed. As may be observed, the overall process includes at least four main processes namely, Data Collection, Model Training, Model Imputation, and Model Testing.

First, during Data Collection, training data is collected under a number of "kick-off" conditions. By experimental design, such conditions are proactively chosen such that they collectively exhibit a broad coverage of factor levels.

Second, during Model Training, an array of models is/are learned jointly on source training data. Each model is parameterized by individual factor model components, while facilitating knowledge sharing across multiple domains. Decomposition of a model into individual factors is based on one of a plurality of tensor decomposition formats, thereby incorporating an appropriate low-rank regularizer.

Third, during Model Imputation, given any new condition for which the model is not already trained but wanted to be tested, a new model is assembled according to the same tensor decomposition format.

Finally, during Model Testing, the new model is tested on the unseen domain.

With this disclosure in place, we note that datasets employed in many scientific fields are naturally multiway, as they are commonly gathered under a variety of experimental conditions. In computer vision applications—for example—such challenges are commonplace. For example, lightning conditions {day, night} and weather conditions {sunny, rainy, fog} commonly encountered in in autonomous driving applications. As those skilled in the art will understand and appreciate, our inventive method accounts for multiway heterogeneous factors encountered in numerous applications. While initially motivated to apply to distributed fiber optic sensing application, our inventive method is be applicable to any application in which data is multi-indexed. Our approach benefits all application operational phases from data collection, model training, to field deployment and advantageously a) reduces cost of data collection as the number of conditions is reduced from a "products of factor levels" to a "sum of factor levels"; b) improves sample efficiency in model training by employing a low-rank regularization of tensor format; and c) leads to better generalization performance in field deployment by allowing a model to be domain-specific.

Figure 5:
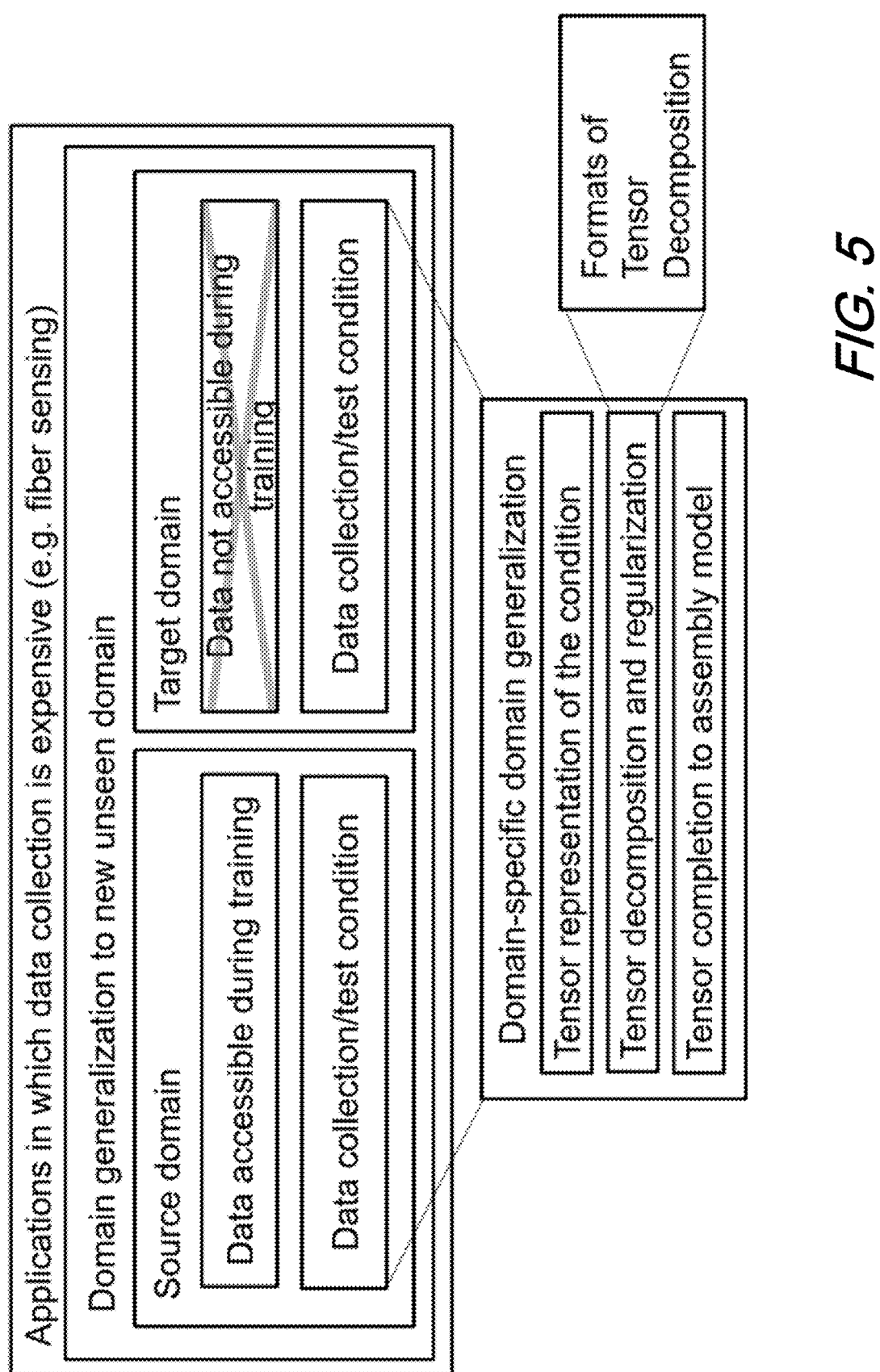
FIG. 5 is a schematic diagram showing an illustrative use of our inventive multilinear domain specific domain generalization according to aspects of the present disclosure.

FIG. 5 is a schematic diagram showing an illustrative use of our inventive multilinear domain specific domain generalization according to aspects of the present disclosure. As may be observed in that figure, our inventive method is particularly suited for applications in which data collection is expensive, including distributed fiber optic sensing. Our method provide domain generalization to a new unseen domain in that a source domain includes data accessible during training and data collection/text condition(s) that are applied to a target domain in which data is not accessible during training.

Figure 6:
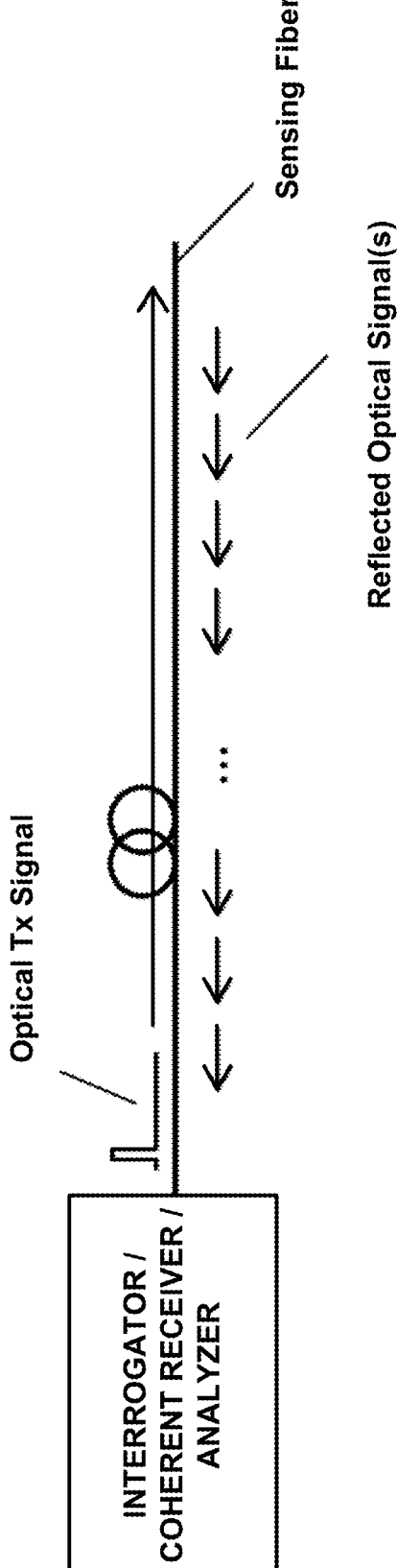
FIG. 6 is a schematic diagram showing an illustrative use of our inventive multilinear domain specific domain generalization in a distributed fiber optic sensor system (DFOS) according to aspects of the present disclosure.

FIG. 6 is a schematic diagram showing an illustrative use of our inventive multilinear domain specific domain generalization in a distributed fiber optic sensor system (DFOS) according to aspects of the present disclosure. As schematically illustrated therein, a DFOS interrogator/analyzer that may include a coherent receiver and neural network is optically connected to a sensing fiber.

As those skilled in the art will understand and appreciate, such DFOS is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

At this point, while we have presented this disclosure using some specific examples, those skilled in the art will recognize that our teachings are not so limited. Accordingly, this disclosure should be only limited by the scope of the claims attached hereto.

The invention claimed is:

1. A multilinear domain-specific domain generalization method (MDSDG) for distributed fiber optic sensing (DFOS), the method comprising:
   providing a DFOS system including a DFOS interrogator/analyzer with neural network in optical communication with an optical sensing fiber;
   operating the DFOS system and
   by the DFOS interrogator/analyzer with neural network:
      obtaining training datasets and identifying any conditions in which an individual dataset is obtained;
      determining an array of models parameterized by factor model components according to an MDSDG scheme;
      assembling a new model according to a chosen tensor decomposition format wherein the new model includes conditions from a target domain in which the new model will be executed wherein at least some of the new model conditions are different from the conditions in which the training datasets were obtained;
      obtaining DFOS data in the new model conditions; and
      analyzing the DFOS data in the new model conditions using the new model and detecting an environmental condition along the optical sensing fiber.

2. The method of claim 1 wherein the new model conditions were unavailable during the obtaining of the training datasets.

3. The method of claim 1 wherein the training datasets include waterfall images resulting from operation of the DFOS system.

4. A distributed fiber optic sensing system DFOS employing multilinear domain-specific domain generalization (MDSDG) for distributed fiber optic sensing the system comprising:
   an interrogator in optical communication with an optical sensing fiber and configured to
   interrogate the optical sensing fiber with laser light pulses and receive reflected or scattered light therefrom;
   an analyzer with neural network communicatively coupled to the interrogator and configured to:
      obtain training datasets from the received reflected or scattered light and identify any conditions in which an individual dataset is obtained;
      determine an array of models parameterized by factor model components according to an MDSDG scheme;
      assemble a new model according to a chosen tensor decomposition format wherein the new model includes conditions from a target domain in which the new model will be executed wherein at least some of the new model conditions are different from the conditions in which the training datasets were obtained;
      obtain DFOS data in new model conditions; and
      analyze the DFOS data in the new model conditions using the new model to detect an environmental condition along the optical sensing fiber.

5. The system of claim 4 wherein the new model conditions are unavailable during the obtaining of the training datasets.

6. The system of claim 4 wherein the training datasets include waterfall images resulting from operation of the DFOS system.

* * * * *